United States Patent
Lee et al.

(10) Patent No.: US 6,529,656 B2
(45) Date of Patent: Mar. 4, 2003

(54) BI-DIRECTIONAL ADD/DROP MULTIPLEXER AND BIDIRECTIONAL ADD/DROP AMPLIFIER MODULE FOR WAVELENGTH INTERLEAVED BIDIRECTIONAL NETWORKS

(75) Inventors: Chang Hee Lee, Taejon (KR); Hyun Deok Kim, Daegu (KR); Jeong Hun Shin, Daegu (KR); Tae Won Oh, Daegu (KR); Yun Hee Cho, Seoul (KR)

(73) Assignee: Samsung Electronics Co. Ltd., Kyungki-do (KR)

( * ) Notice: Subject to any disclaimer, the term of this patent is extended or adjusted under 35 U.S.C. 154(b) by 87 days.

(21) Appl. No.: 09/767,917

(22) Filed: Jan. 24, 2001

(65) Prior Publication Data

US 2001/0028757 A1 Oct. 11, 2001

(30) Foreign Application Priority Data

Apr. 10, 2000 (KR) .......................................... 00-58297

(51) Int. Cl.$^7$ .................................................. G02B 6/28
(52) U.S. Cl. ............................ 385/24; 385/31; 385/15; 359/115
(58) Field of Search ............................. 385/24, 15, 31; 359/115

(56) References Cited

U.S. PATENT DOCUMENTS

| 5,778,118 A | * | 7/1998 | Sridhar ...................... 359/114 |
| 5,953,141 A | * | 9/1999 | Liu et al. .................... 359/124 |
| 6,188,509 B1 | * | 2/2001 | Lee et al. ................... 359/124 |
| 6,243,177 B1 | * | 6/2001 | Duerksen ..................... 359/124 |

* cited by examiner

Primary Examiner—Rodney Bovernick
Assistant Examiner—Sung Pak
(74) Attorney, Agent, or Firm—Steve Cha; Cha & Reiter (57) ABSTRACT

The present invention discloses a bi-directional add/drop multiplexer (BADM) and a bi-directional add/drop amplifier (BADA) module which add/drop wavelength-interleaved counter-propagating signals. The mid-stage device in the BADM and the BADA module is shared by the counter-propagating signals.

16 Claims, 10 Drawing Sheets

BI-DIRECTIONAL ADD/DROP MULTIPLEXER AND BIDIRECTIONAL ADD/DROP AMPLIFIER MODULE FOR WAVELENGTH INTERLEAVED BIDIRECTIONAL NETWORKS

BACKGROUND OF THE INVENTION

1. Field of the Invention

The present invention relates to a bidirectional add/drop multiplexer (BADM) and a bidirectional add/drop amplifier (BADA) module. More particularly, it relates to the BADM and the BADA module with a mid-stage device that is shared by the wavelength interleaved counter-propagating signals.

2. Description of the Related Art

A wavelength-division multiplexing (WDM) optical network uses different wavelengths to establish communication channels among the nodes. The network requires add/drop function for receiving/transmitting wanted wavelength signals at each node. Therefore, a WDM add/drop multiplexer (ADM) is an important constituent to realize the WDM optical network. The ADM is especially emphasized in a WDM ring network.

A bidirectional WDM ring network can be realized by using either undirectional ADMs or BADMs. The BADM, which can add/drop WDM signals propagating bidirectionally over a single. fiber, reduces the use of fiber infrastructure by a factor two.

Figure 1:
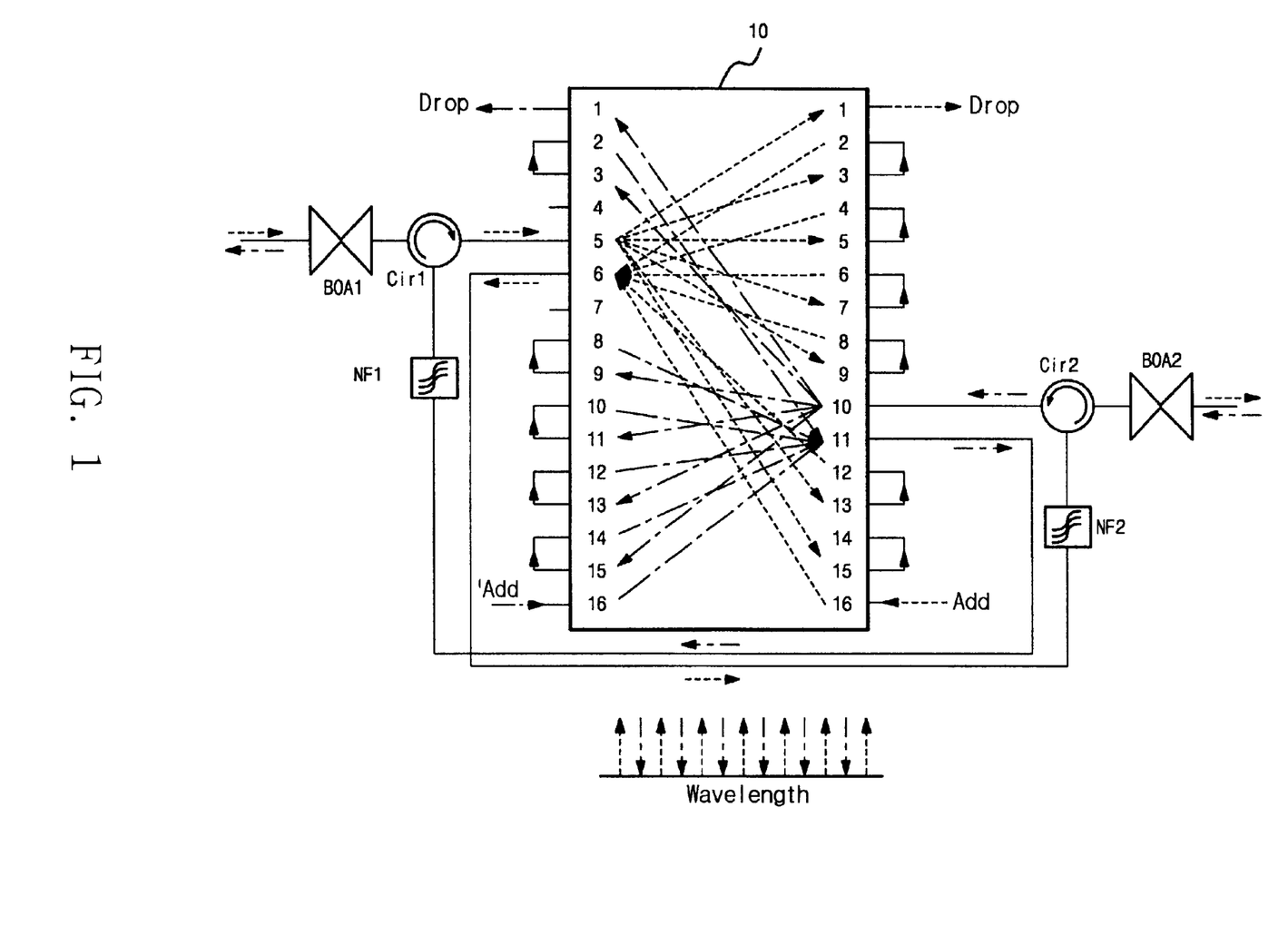
FIG. 1 shows a schematic diagram of a conventional bidirectional add/drop optical amplifier module.

FIG. 1 shows an example of such a BADM proposed in a paper of Jang-Won Park and Chang-Hee Lee, "Wavelength interleaved bidirectional add/drop amplifier module,." *IEEE Photon. Technol. Lett.*, vol. 12, pp. 326–328, 2000. Compared to the conventional BADM, the bidirectional add/drop amplifier (BADA) module of FIG. 1 further provides the function of signal amplification. Namely, the BADA module could not only add/drop but also amplify WDM signals propagating bidirectionally over a single fiber. Especially the BADA module of FIG. 1 was used to accommodate two groups of WDM signals whose wavelengths are interleaved according to the their propagation direction.

Meanwhile, in order to increase the capacity and extend the geographical scale of the WDM networks, the following three means are generally used : (1) Means for compensating the chromatic dispersion of the optical fibers. (2) Means for flattening the spectral response of the optical amplifiers. (3) Means for suppressing the accumulation of the amplified spontaneous emission (ASE) noise. The dispersion compensating fiber (DCF) is a typical means for compensating the chromatic dispersion of the optical fibers, the gain flattening filter (GFF) for flattening the spectral response of the optical amplifiers, and the ASE rejection filter for suppressing the accumulation of the ASE noise. These devices are usually used in the mid-stage of the optical amplifiers in order to minimize the optical signal-to-noise ratio degradation.

There are some problems to incorporate the mid-stage devices with the BADA module of FIG. 1. For example, we should use different DCF for each way signal to prevent the signal degradation induced by the large back reflection of the DCF, which increases the cost of dispersion compensation.

SUMMARY OF THE INVENTION

The present invention is contrived in order to solve the above-mentioned problems. It is an object of the present invention to provide a BADM and a BADA module. Wherein, (1) the mid-stage device for increasing the capacity and extending the geographical scale of the networks, including a DCF, a GFF and an ASE rejection filter, is shared by the counter-propagating signals. (2) The counter-propagating signals pass through the shared mid-stage device in opposite direction each other to minimize the signal impairment in it. (3) The relative intensity noise (RIN) induced by the multiple reflection is effectively suppressed.

In order to meet the above object, the present invention includes an N×N arrayed waveguide grating router (AWGR), two optical circulators, two wavelength selective couplers, two optical isolators, and a mid-stage device. The mid-stage device comprises a means for compensating the chromatic dispersion of the optical fibers, a means for flattening the spectral response of the optical amplifiers, a means for suppressing the :accumulation the ASE noise or a combination of these means.

BRIEF DESCRIPTION OF THE DRAWINGS

Exemplary embodiments of the present invention will be described in conjunction with the drawings in which.

EXPLANATIONS FOR MAIN SYMBOLS IN THE DRAWINGS

10: arrayed waveguide grating router (AWGR),
12: mid-stage device,
Cir1, Cir2, Cir3, Cir4, Cir5, Cir6: optical circulator,
CF1, CF2: comb filter,
Iso1, Iso2, Iso3, Iso4, Iso5, Iso6: optical isolator, NF1, NF2: notch filter, BOA1, BOA2: bidirectional optical amplifier (BOA), UOA1, UOA2: unidirectional optical amplifier (UOA), WSC1, WSC2, WSC3, WSC4: wavelength selective coupler (WSC).

DETAILED DESCRIPTION OF THE EMBODIMENTS

The first embodiment of the BADM according to the present invention comprises an N×N AWGR (10), two optical circulators (Cir1, Cir2), two wavelength selective couplers (WSC1, WSC2), two optical isolators (Iso1, Iso2) and a mid-stage device (12).

Each component of the BADM is examined in detail as follows: (1) Each of the two wavelength selective couplers (WSC1, WSC2) has an input port (d1 or d2), an output port (f1 or f2), and a common port (e1 or e2) (2) Each of the two optical isolators (Iso1, Iso2) has an input port (g1 or g2) and an output port (h1 or h2). (3) Each of the two optical circulators (Cir1, Cir2) has an input port (a1 or a2), an output port (c1 or c2), and a common port (b1 or b2). (4) An N×N AWGR, which has N input/output ports at its both sides, routes the counter-propagating WDM signals. (5) A mid-stage device comprises a means for compensating the chromatic dispersion of the optical fibers, a means for flattening the spectral response of the optical amplifiers, a means for suppressing the accumulation the ASE noise or a combination of these means.

The connections among the components are as follows: The output port (f1 or f2) of the wavelength selective coupler (WSC1 or WSC2) is connected to the input port (a1 or a2) of the optical circulator (Cir1 or Cir2). The input port (d1 or d2) of the wavelength selective coupler (WSC1 or WSC2) is connected to the output port (h1 or h2) of the optical isolator (Iso1 or Iso2). The input port (g1 or g2) of the optical isolator (Iso1 or Iso2) is connected to one input/output port of the N×N AWGR (10). The output port (c1 or c2) of the optical circulator (Cir1 or Cir2) is connected to another input/output port of the N×N AWGR (10). The common ports (b1 and b2) of the optical circulator (Cir1 and Cir2) are connected to the both ends of the mid-stage device (12).

The first embodiment of the BADA module according to the present invention comprises the above-described BADM and two bidirectional optical amplifiers (BOA1, BOA2) which amplifies the counter-propagating signals simultaneously. The connections of the optical amplifiers and the components in the above-described BADM are as follows: The common port (e1 or e2) of the wavelength selective coupler (WSC1 or WSC2) in the above-described BADM is connected to the bidirectional amplifier (BOA1 or BOA2).

The BADA module can further comprises two unidirectional optical amplifiers (UOA1 or UOA2). Each unidirectional amplifier amplifies only one way signal and connected between the output port (c1 or c2) of the optical circulator (Cir1 or Cir2) and one input/output port-of the N×N AWGR.

Figure 2:
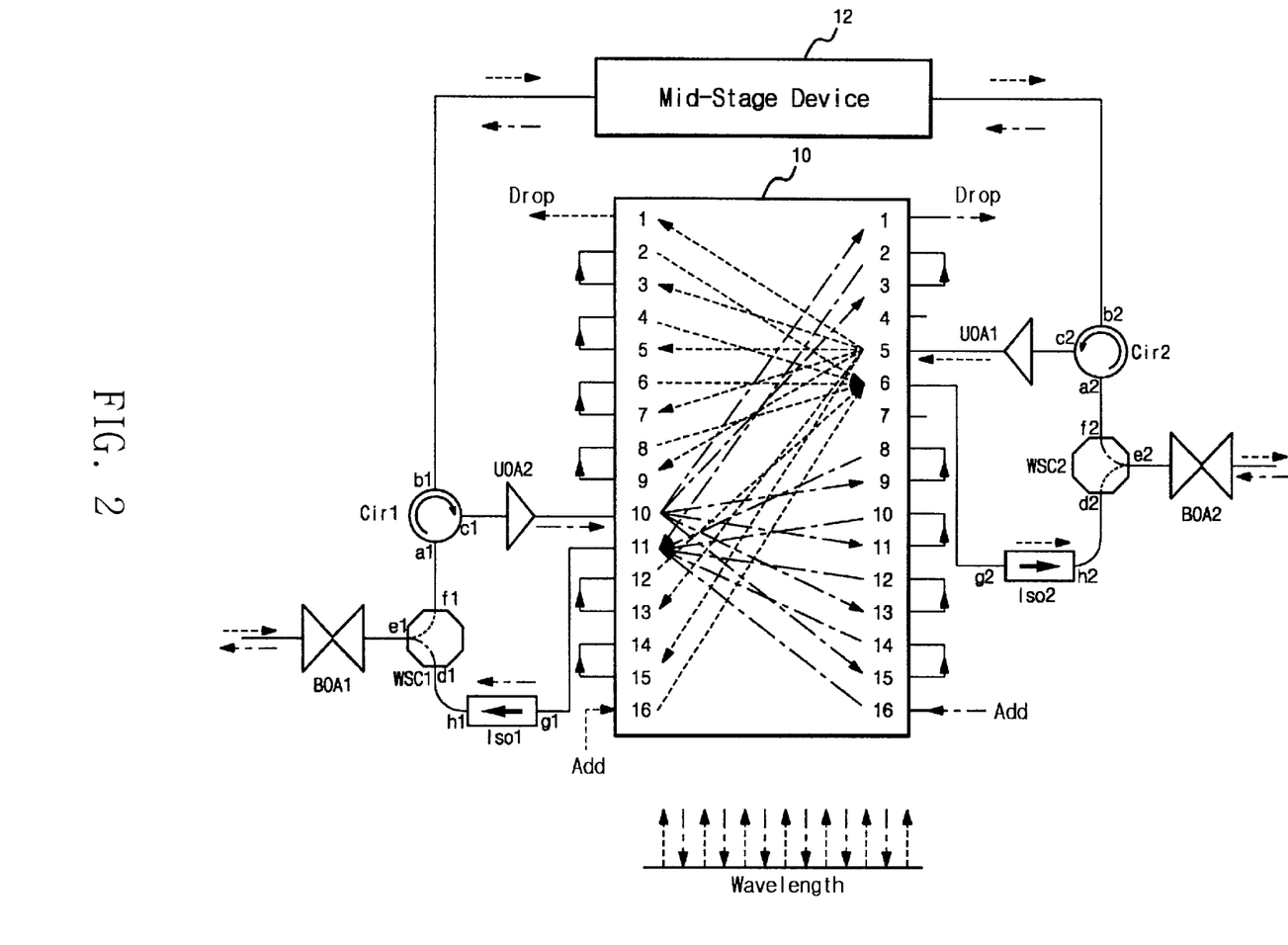
FIG. 2 shows a schematic diagram of the bidirectional add/drop multiplexer and the bidirectional add/drop amplifier module using a 16×16 array waveguide grating router according to the first embodiment of the present invention.

FIG. 2 shows a schematic diagram of the BADM and the BADA module according to the first embodiment of the present invention. The exemplary embodiment of FIG. 2 is a specific one implemented by using a 16×16 AWGR (10). The BADM and the BADA module of FIG. 2 can accommodate seven downstream signals propagating from the left to the right and six upstream signals propagating from the right to the left. The downstream and the upstream signals are interleaved in wavelength domain as shown in FIG. 2.

The difference of the BADM and the BADA is the capability of the signal amplification. The BADA module contains optical amplifiers (BOA1, BOA2, UOA1, UOA2), while the BADM none.

The operation principle of the BADM of FIG. 2 is as follows.

The downstream signals inputted to the common port (e1) of the WSC1 pass through the WSC1 and the Cir1 and enter into the mid-stage device (12). After passing through the mid-stage device (12) and the Cir2, the downstream signals enter into the AWGR (10) via the right-hand side port 5. The AWGR demultiplexes the downstream signals and the demultiplexed signals come out through the left-hand side port 1, 3, 5, 7, 9, 13 and 15 of the AWGR (10). Any of the demultiplexed signals can be either dropped or pass through the BADM. For example, the signal to be received at the BADM is dropped via the left-hand side port 1 of the AWGR (10). The other signals are folded back to the left-hand side port 2, 4, .6, 8, 12 and 14 of the AWGR (10) to pass through the BADM. The signal with identical wavelength with the dropped signal can be added through the left-hand side port 16 of the AWGR (10). The AWGR (10) multiplexes the signals folded back and added and the multiplexed downstream signals come out through the right-hand side port 6 of the AWGR (10). Then, the downstream signals pass through the Iso2 and come out through the common port (e2) of the WSC2.

The upstream signals inputted to the common port (e2) of the WSC2 pass through the WSC2 and the Cir2 and enter into : the mid-stage device (12). After passing through the mid-stage device (12) and the Cir1, the upstream signals enter into the AWGR (10) via the left-hand side port 10. The AWGR demultiplexes the upstream signals and the demultiplexed signals come out through the right-hand side port 1, 3, 9, 11, 13 and 15 of the AWGR (10). Any of the demultiplexed signals can be either dropped or pass through the BADM. For example, the signal to be received at the BADM is dropped via the right-hand side port 1 of the AWGR (10). The other signals are folded back to the right-hand side port 2, 8, 10, 12 and 14 of the AWGR (10) to pass through the BADM. The signal with identical wavelength with the dropped signal can be added through the right-hand side port 16 of the AWGR (10). The AWGR (10) multiplexes the signals folded back and added signal and the multiplexed upstream signals come out through the left-hand side port 11 of the AWGR (10). Then, the signals pass through the Iso1 and come out through the common port (e1) of the WSC 1.

As mentioned above, the upstream and the downstream signals simultaneously pass through a mid-stage device (12) in the first embodiment of the present invention. However, the nonlinear interaction between the upstream and the downstream signals in the mid-stage device (12) will be negligible since they propagate in opposite direction each other in it (12).

The BADA module of FIG. 2 comprises above-described BADM and two bidirectional amplifiers (BOA1, BOA2) for amplifying signals. The BOA1 and the BOA2 used in the first embodiment of the BADA module are connected to the common ports (e1, e2) of the WSC1 and WSC2 of the above-described BADM, respectively. They amplify the upstream and the downstream signals simultaneously. The BADA module can further comprises two unidirectional amplifiers (UOA1 and UOA2) as shown in FIG. 2. The UOA1 is connected between the output port (c2) of the Cir2 and the right-hand side port 5 of the AWGR (10) to further amplify the downstream signal. The UOA2 is connected between the output port (c1) of the Cir1 and the left-hand side port 10 of the AWGR (10) to further amplify the upstream signal.

The BOA1, the BOA2, the UOA1 and the UOA2 are one of the followings; semiconductor optical amplifier, rare-earth element (such as Er, Pr, Tm) doped optical fiber amplifier, and Raman optical amplifier.

Figure 3:
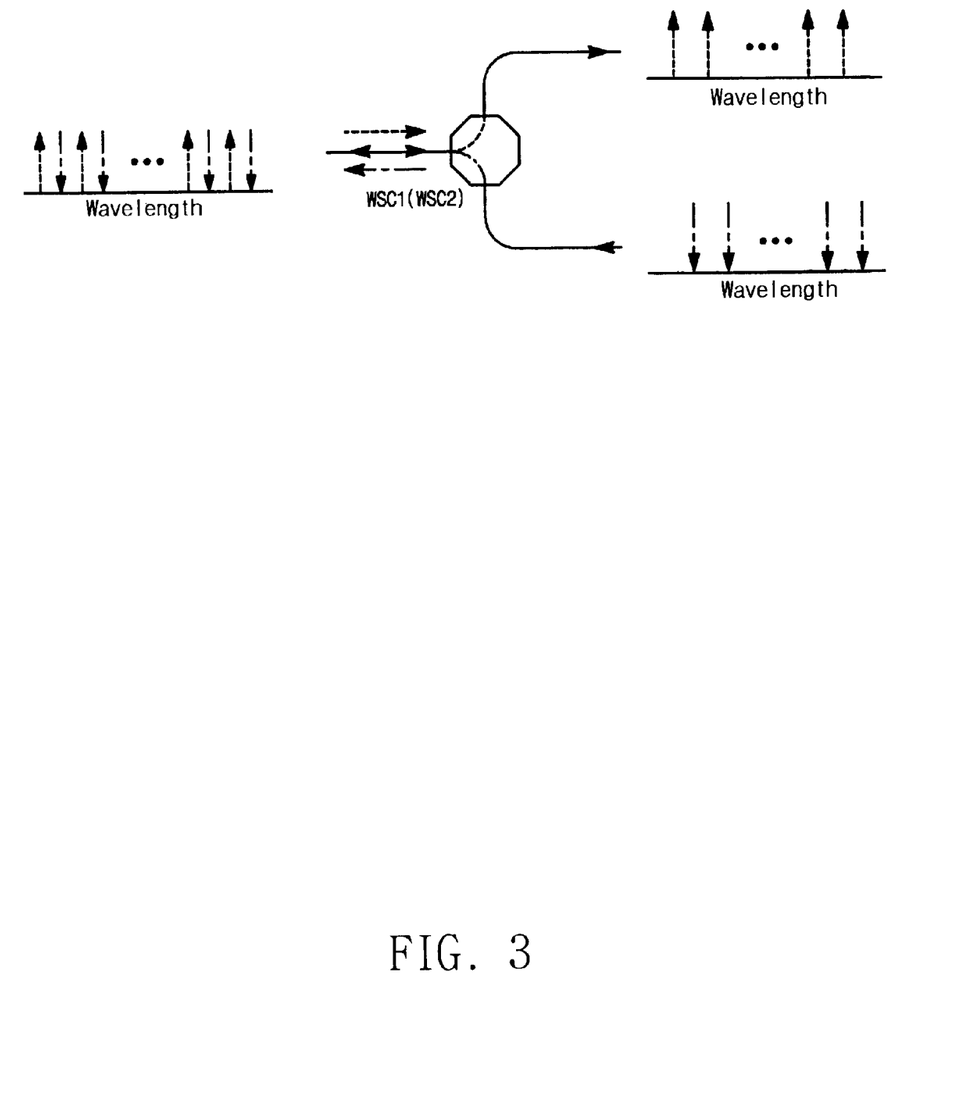
FIG. 3 shows a characteristic of the wavelength selective coupler shown in FIG. 2.

As shown in FIG. 3, the wavelength selective coupler (WSC1, WSC2) routes bidirectionally two groups of WDM signal whose wavelengths are interleaved each other. A typical example of such a wavelength selective coupler is a wavelength interleaver.

Figure 4:
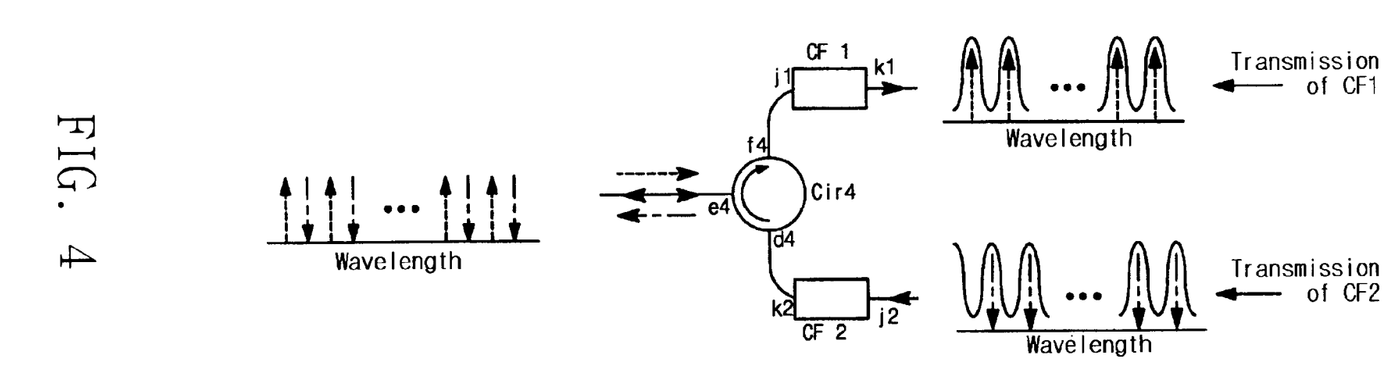
FIG. 4 shows an exemplary configuration of the wavelength selective coupler realized by using an optical circulator and two comb filters.

The wavelength selective coupler (WSC1, WSC2) can be realized with an optical circulator (Cir4) and two comb filters (CF1, CF2) with identical free spectral ranges (FSRs), as shown in FIG. 4. In this case, the pass bands of CF2 offsets by a half of the FSR from that of CF1.

In other words, the wavelength selective coupler (WSC1 or WSC2) comprises; (1) an optical circulator (Cir4) with an input (d4), an output (f4) and an common port (e4). (2) A comb filter (CF1) with an input (j1) and an output port (k1). (3) A comb filter CF2 with an input (j2) and an output port (k2) whose pass band offsets by a half of the FSR from that of CF1. The out port (f4) of the optical circulator (Cir4) is connected to the input port (j1) of CF1, and the input port (d4) of the optical circulator (Cir4) is connected to the output port (k2) of CF2.

The relative intensity noise (RIN) caused by the Rayleigh back scattering of the optical fiber and/or the reflections of the optical components can degrade receiver sensitivity in bidirectional optical networks. The RIN accumulates along the signal path since the optical amplifier;amplifies the RIN as well as signals. Thus, it is desirable that the BADA module can attenuate the multiple reflection induced RIN.

Figure 5:
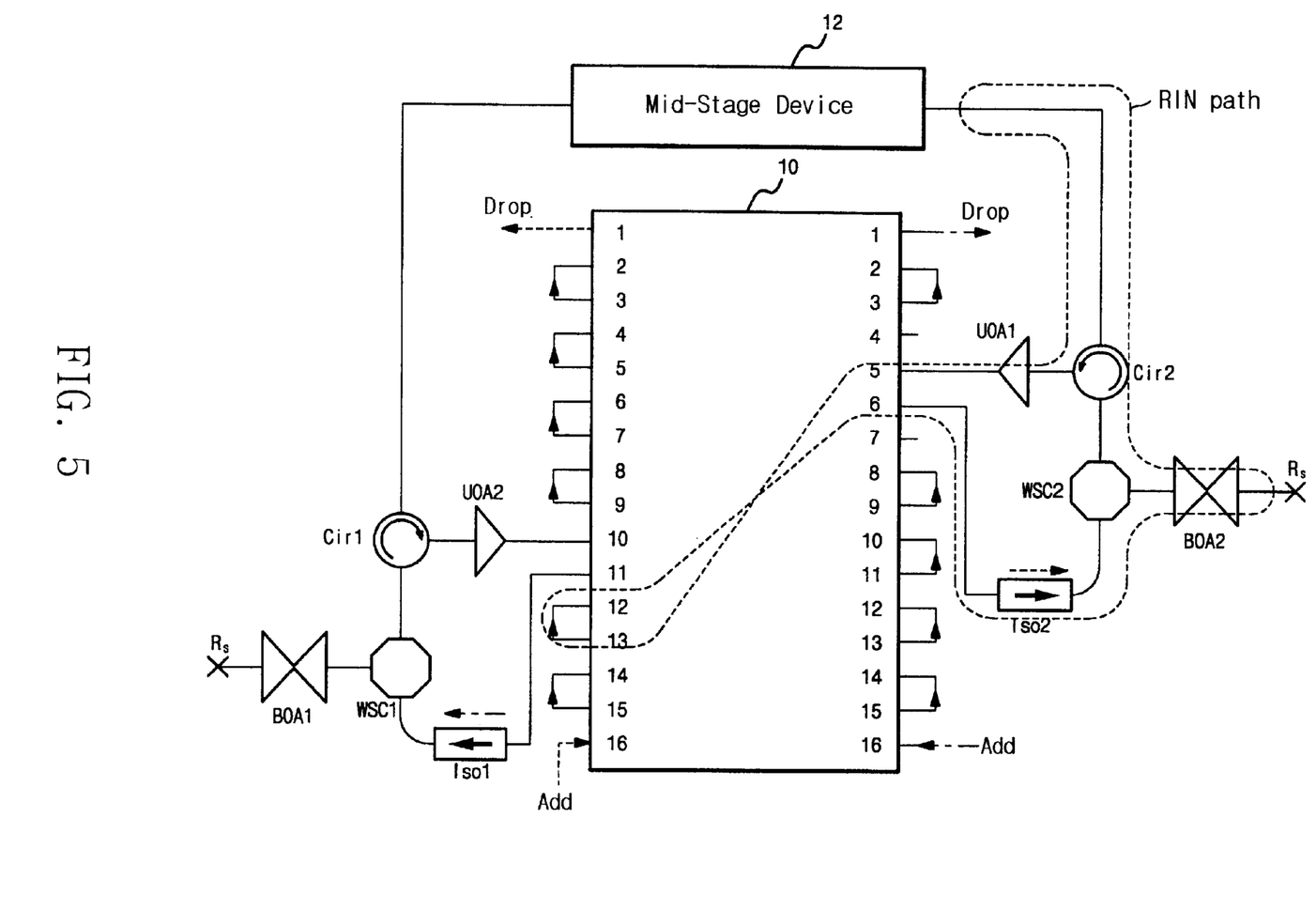
FIG. 5 shows a relative intensity noise (RIN) generation path in FIG. 2.
Figure 6:
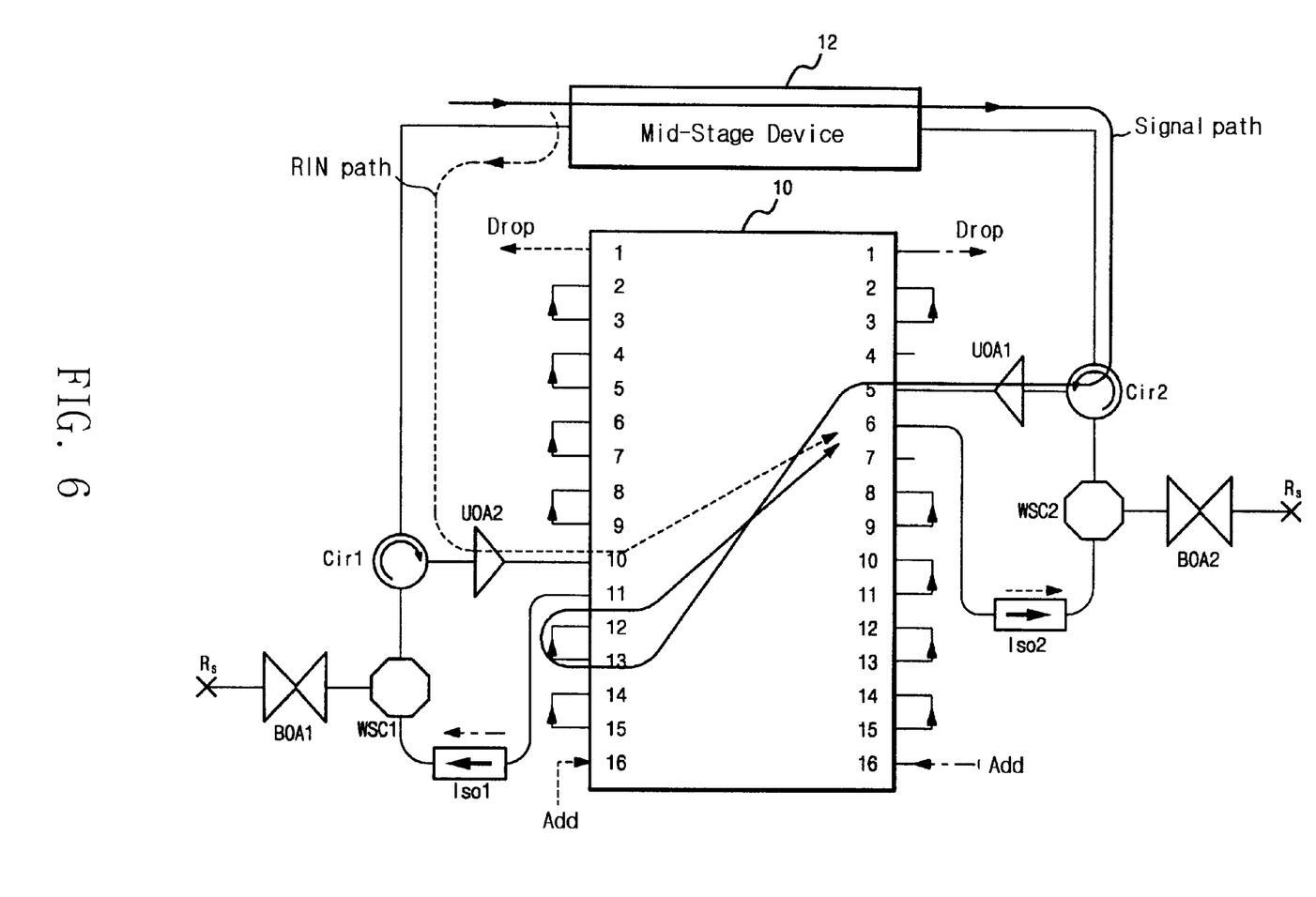
FIG. 6 shows another relative intensity noise (RIN) generation path in FIG. 2.

There are two main RIN paths when the optical fibers are connected to both sides of the BADA module of FIG. 2. The first and the second RIN paths are depicted in FIG. 5 and FIG. 6, respectively. For simplicity, they show a case for only one downstream signal. $R_S$ is the Rayleigh back scattering coefficient of the optical fibers connected to the BADA module.

As depicted in FIG. 5, the first RIN is generated due to the reflection at the mid-stage device (12) and the Rayleigh back scattering of the optical fiber connected to the right-hand side of the BADA module. The downstream signal is reflected by an amount of $R_S$ at the optical fiber. The reflected signal is amplified at the BOA2 and leaks to the output port of the WSC2 due to the finite crosstalk level of the WSC 2. Then, it is reflected at the mid-stage device (12) after passing through the optical circulator (Cir2), combines with the main signal, and propagates along the downstream signal route to generate RIN. The RIN generated in this path is attenuated by an amount of the crosstalk level of the WSC2.

As depicted in FIG. 6, the second RIN is generated due to the reflection at the mid-stage device (12) and the crosstalk of the AWGR (10). The reflected signal at the mid-stage device (12) passes through the Cir1 and the UOA2 and enters into the left-hand side port 10 of the AWGR (10). Then, it leaks to the right-hand side port 6 of the AWGR (10) due to the finite crosstalk level of the AWGR (10), combines with the main signal and propagates along the downstream signal route to generate RIN. The RIN generated in this path is attenuated by an amount of the crosstalk level of the AWGR (10). There are corresponding RIN paths for the other downstream signals and the upstream signals.

The multiple reflection induced RINs are attenuated at least once by the AWGR (10) or the wavelength selective coupler (WSC1 or WSC2) in BADA module according to the present invention. Thus, the BADA module sufficiently suppresses the RIN even if the mid-stage device (12) includes a DFC with high Rayleigh back scattering coefficient.

The BADM and the BADA module of FIG. 2 realized with a 16×16 AWGR accommodate up to seven downstream and six upstream signals. Generally, when the BADM and the BADA module according to the first embodiment of the present invention is realized with an N×N AWGR (N: even number), they can accommodate up to N/2−1 signals one direction and N/2−2 signals in the other direction. The BADM and the BADA module according to the second embodiment of the present invention can accommodate up to N/2−1 signals in both directions by adding an optical circulator (Cir3) to the first embodiment in case of N is even number. The additional optical circulator (Cir3) whose common port is connected to the one of the AWGR input/output ports provides the propagation route for the additional signal.

On other hand, if the BADM and BADA module according to the first embodiment of the present invention is realized with N×N AWGR (N : odd number), they can accommodate (N−1)/2−1 signals in both direction (both the downstream and the up stream signals). The BADM and the BADA module according to the second embodiment of the present invention can accommodate up to (N−1)/2 signals in both directions by adding two optical circulators (Cir5, Cir6) to the first embodiment in case of N is odd number. Each optical circulator (Cir5 or Cir6) whose common port is Aids connected to the one of the AWGR input/output ports provides the propagation route for the additional signal.

Figure 7A:
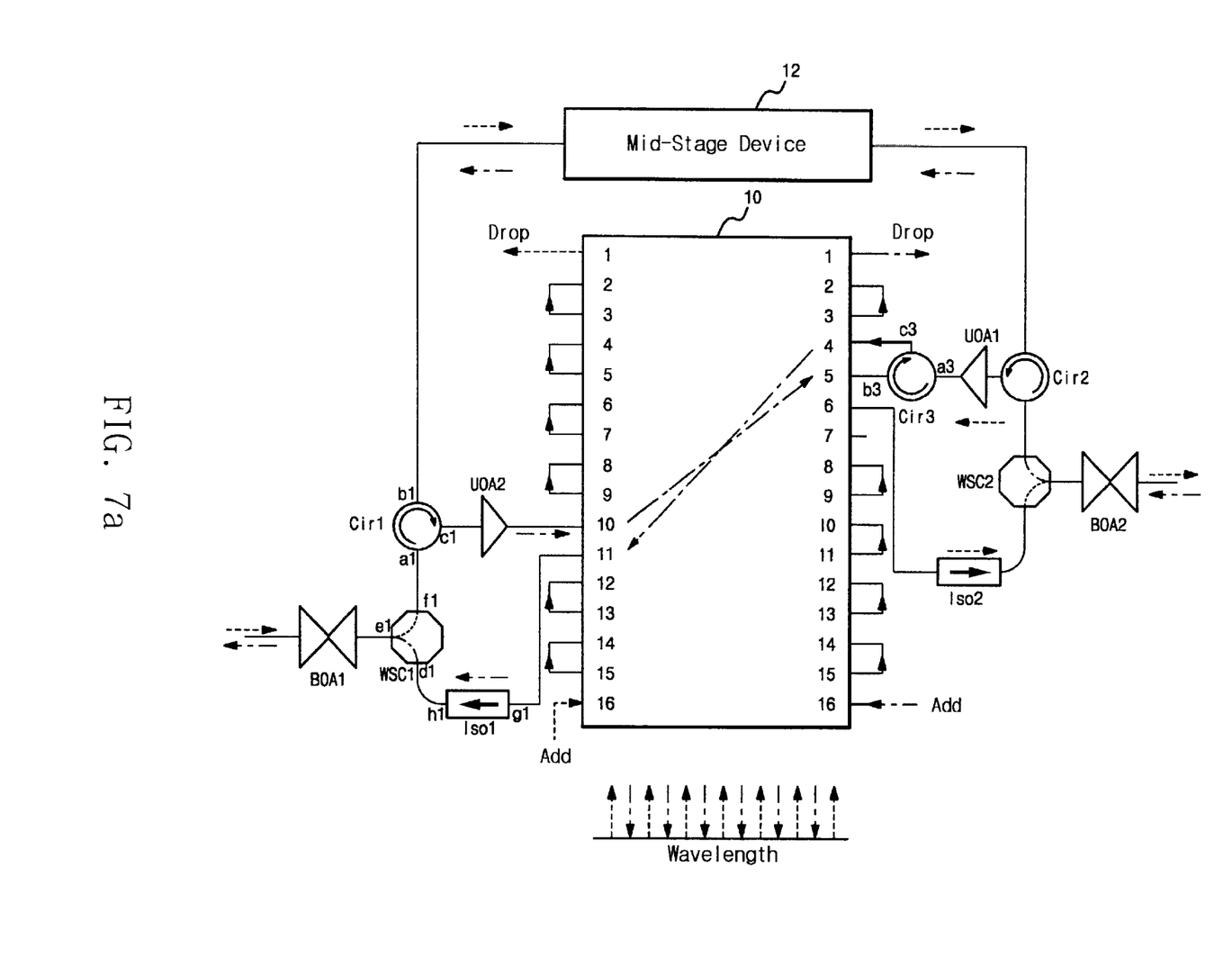
FIG. 7a shows a schematic diagram of the bidirectional add/drop multiplexer and the bidirectional add/drop amplifier module using a 16×16 array waveguide grating router according to the second embodiment of the present invention.

FIG. 7a shows a schematic diagram of the BADM and the BADA module using a 16×16 AWGR according to the second embodiment of the present invention. Compared to the BADM and the BADA module in FIG. 2, they further comprise an additional optical circulator (Cir3) with an input port (a3), an output port (c3) and a common port (b3). The input port (a3), the output port (c3);and the common port (b3) the Cir3 are connected to the UOA1, right-hand side port 4 of the AWGR (10) and right-hand side port 5 of the AWGR (10), respectively. The BADM and the BADA module of FIG. 7a can accommodate one additional upstream signal compared to the first embodiment of FIG. 2 since the additional optical circulator (Cir3) provide propagation route for the additional signal.

The operation principle is similar to that of the FIG. 2 except that the downstream signals pass through the additional optical circulator (Cir3) before entering into the AWGR (10). As shown in FIG. 7a, the additional upstream signal inputted to the AWGR (10) via the left-hand side port 10, is routed to the right-had side port 5 of the AWGR, and come out through the output port (c3) of the Cir3. This signal can be either dropped or folded back to the left-hand side port 4 of AWGR (10). The signal with the same wavelength can be added through the left-hand side port 4 of AWGR (10). The signal will be multiplexed with other upstream signals by the AWGR (10) and propagate along the same path with them.

Figure 7B:
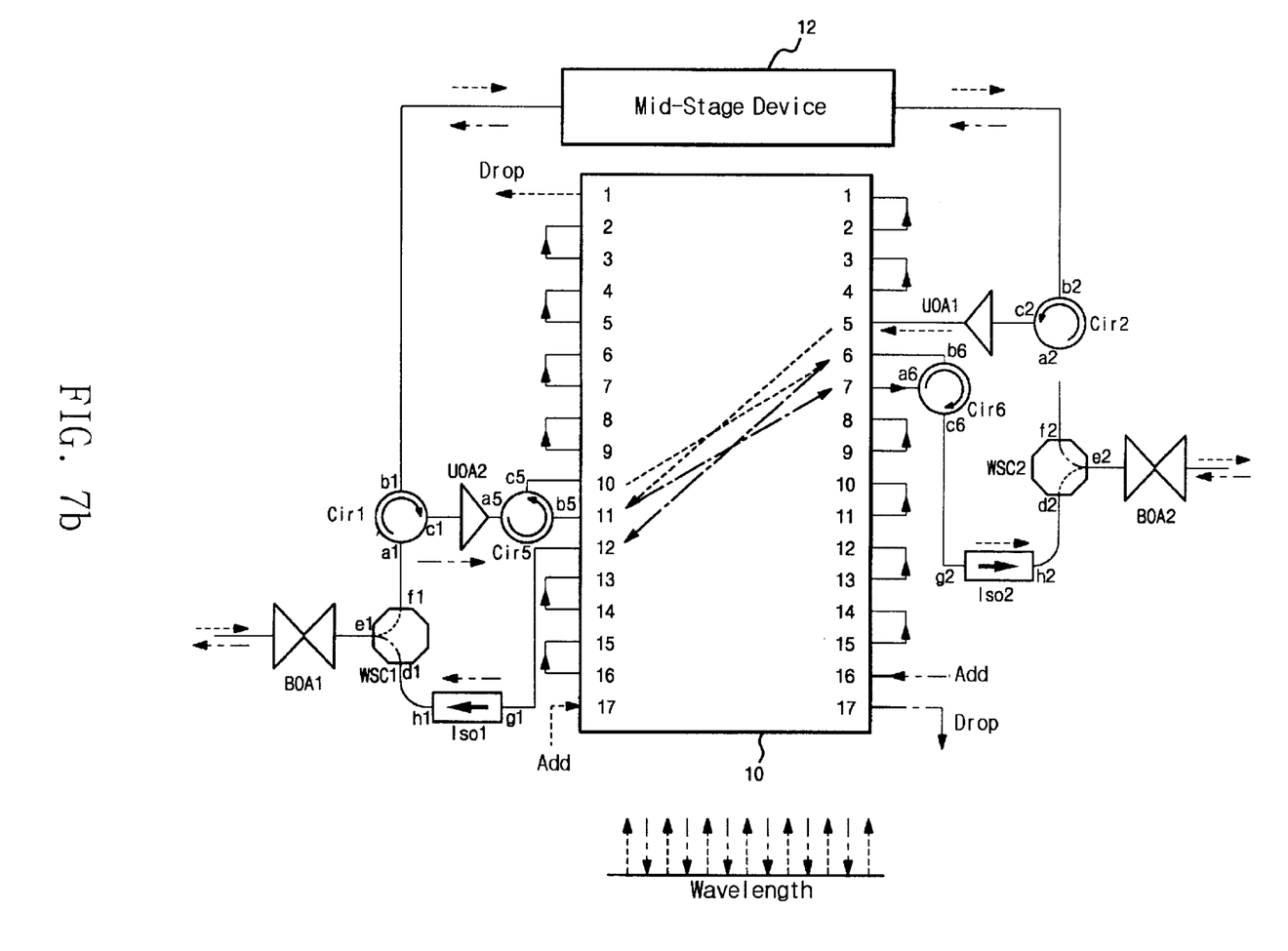
FIG. 7b shows a schematic diagram of the bidirectional add/drop multiplexer and the bidirectional add/drop amplifier module using a 17×17 array waveguide grating router according to the second embodiment of the present invention.

FIG. 7b shows a schematic diagram of the BADM and BADA module using a 17×17 AWGR according to the second embodiment of the present invention. The BADM and BADA module using a 17×17 according to the first embodiment can accommodate seven signals in both directions, while the BADM and the BADA module of FIG. 7b eight signals in both directions. Only the routes of additional signals are depicted in the FIG. 7b.

Compared to the first embodiment, the second embodiment further comprises to optical circulators (Cir5, Cir6) with (a5, a6), an output port (c5, c6) and a common port (b5, b6) The input port (a5), the output port (c5) and the common port (b5) of the Cir5 are connected to the UOA2, left-hand side port 10 of the AWGR (10) and left-hand side port 11 of the AWGR (10), respectively. The input port (a6), the output port (c6) and the common port (b6) the Cir6 are right-hand side port 7 of the AWGR (10), of input port (g2) of Iso2 and the right-hand side port 6 of the AWGR (10), respectively.

The operation principle of the BADM and BADA module is similar to the BADM and BADA module of FIG. 2 except for the follows: (1) Before the upstream signals enter into the AWGR (10), they pass through an additional optical circulator (Cir5). (2) The multiplexed downstream signals coming out the AWGR (10) pass through the other additional optical circulator (Cir6) and then enter into the input port (g2) of the Iso2. (3) The additional downstream signal inputted to the AWGR (10) via right-hand side port 5 of the AWGR (10), is routed to the left-had side port 11 of the AWGR, and come out through the output port (c5) of Cir5. This signal can be either dropped or folded back to the right-hand side port 10 of the AWGR (10). The signal with the same wavelength can be added through the left-hand side port 10 of the AWGR (10). The signal will be multiplexed with other downstream signals by the AWGR and propagate along the same path 70 with them. (4) The additional upstream signal inputted to the AWGR (10) via left-hand side port 11 of the AWGR (10) comes out at the right-had side port 7 of the AWGR. This signal can be either dropped or inputted into the input port (a6) of the Cir6. The signal with the s.same wavelength can be added into the input port (a6) of the Cir6. The signal will be multiplexed with other downstream signals by the AWGR and propagate along the same path with them.

In the above mentioned embodiment, the second optical isolator (Iso2) could be eliminated since the Cir6 prevents the signal flow from the input port (d2) of the WSC2 to the AWGR (10) via right-hand side port 6.

The BADM and the BADA module according to the third embodiment of the present invention is realized by using the same optical components used in the first embodiment, while it has a different configuration.

The third embodiment of the BADM according to the present invention comprises: (1) Two wavelength selective couplers (WSC1, WSC2) with an input port (d1 or d2), an output port (f1 or f2), and a common port (e1 or e2). (2) Two optical isolators (Iso1, Iso2) with an input port (g1 or g2) and an output port (h1 or h2). (3) Two optical circulators (Cir1, Cir2) with an input port (a1 or a2), an output port (c1 or c2) and a common port (b1 or b2). (4) An N×N AWGR with N input/output ports at its both sides routing the counter-propagating WDM signals. (5) A mid-stage device comprises a means for compensating the chromatic dispersion of the optical fibers, a means for flattening the spectral response of the optical amplifiers, a means for suppressing the accumulation the ASE noise or a combination of these means.

And the connections are follows. (1) The input port (d1 or d2) of the wavelength selective coupler (WSC1 or WSC2) is connected to the output port (c1 or c2) of the optical circulator (Cir1 or Cir2). (2) The output port (f1 or f2) of the wavelength selective coupler (WSC1 or WSC2) is connected to the input port (g1 or g2) of the optical isolator (Iso1 or Iso2). (3) The output port (h1 or h2) of the optical isolator (Iso1 or Iso2) is connected to one input/output port of the N×N AWGR. (4) The input port (a1 or a2) of the optical circulator (Cir1 or Cir2) is connected to another input/output port of the N×N AWGR. And (5) the common ports (b1 and b2) of the optical circulators (Cir1 and Cir2) are connected to the both ends of the mid-stage device.

The third embodiment of the BADA module comprises the above-described BADM and two bidirectional optical amplifiers (BOA1, BOA2) which can amplifies the counter-propagating signals simultaneously. The connections of the optical amplifiers and the components in the above-described BADM are as follows: The common port (e1 or e2) of the wavelength selective coupler (WSC1 or WSC2) in the above-described BADM is connected to the bidirectional amplifier (BOA1 or BOA2).

The BADA module can further comprises two unidirectional optical amplifiers (UOA1 or UOA2). Each unidirectional amplifier amplifies only one way signal and connected between one input/output port of the N×N AWGR and the input port (a1 or a2) of the optical circulator (Cir1 or Cir2).

Figure 8:
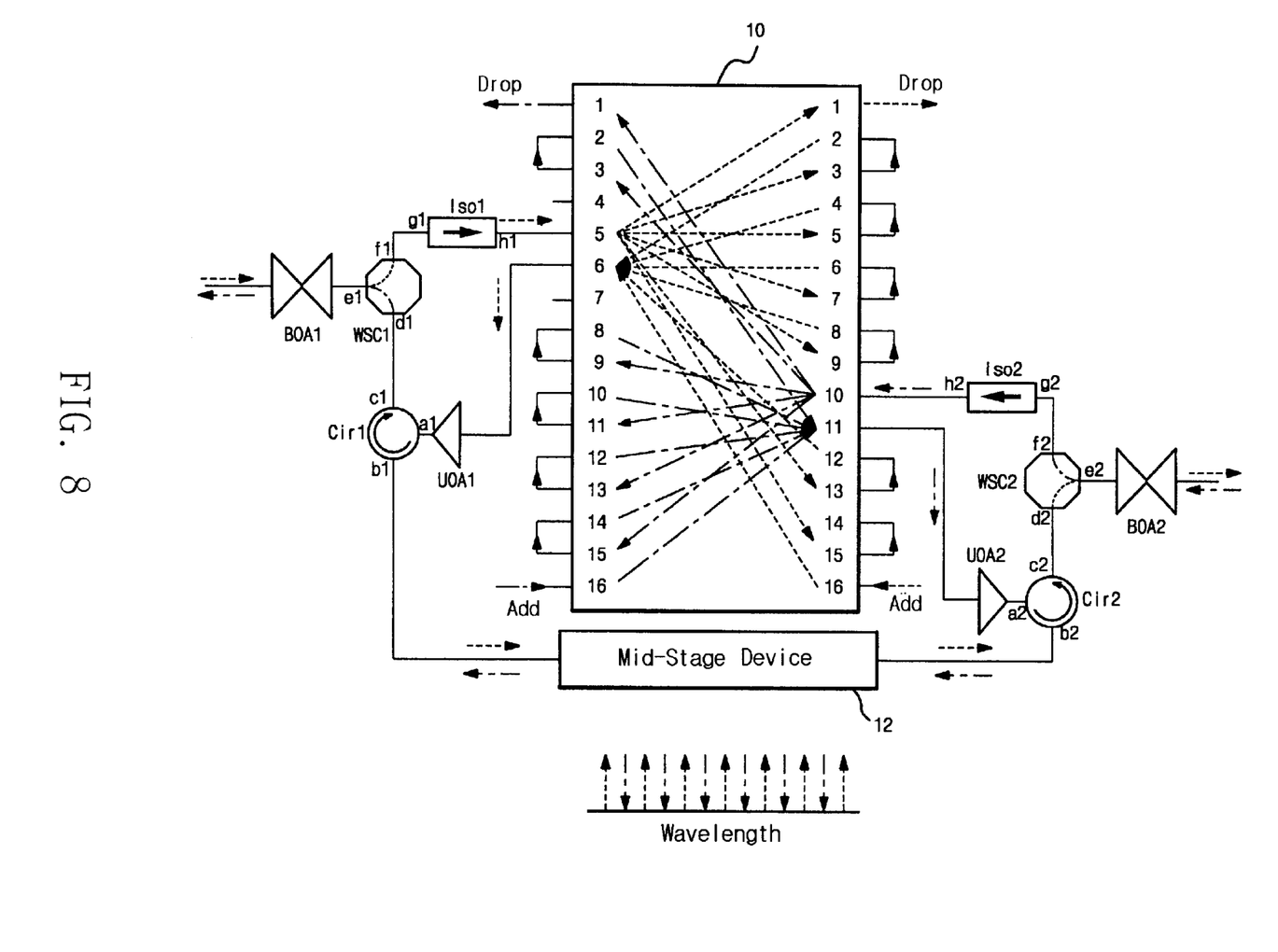
FIG. 8 shows a schematic diagram of the bidirectional add/drop multiplexer and the bidirectional add/drop amplifier module using a 16×16 array waveguide de grating router according to the third embodiment of the present invention.

FIG. 8 shows a schematic diagram of the BADM and the BADA module according to the third embodiment of the present invention. The exemplary embodiment of FIG. 8 is a specific one implemented by using a 16×16 AWGR (10). The BADM and BADA module of FIG. 8 can accommodate seven downstream signals propagating from the left to the right and six upstream signals propagating from the right to the left. The downstream and the upstream signals are interleaved in wavelength domain as shown in FIG. 8.

The difference of the BADM and the BADA is the capability of the signal amplification. The BADA module contains optical amplifiers (BOA1, BOA2, UOA1, UOA2) r while the BADM none.

The operation principle of the BADM of FIG. 8 is as follows.

The downstream signals inputted to the common port (e1) of the WSC1 pass through the WSC1 and the Iso1 and enter into the AWGR (10) via left-hand side port 5. The AWGR demultiplexes the downstream signals and the demultiplexed signals come out through the right-hand side port 1, 3, 5, 7, 9, 13 and 15 of the AWGR (10). Any of the demultiplexed signals can be either dropped or pass through the BADM. For example, the signal to be received at the BADM is dropped via the right-hand side port 1 of the AWGR (10). The other signals are folded back to the right-hand side port 2, 4, 6, 8, 12 and 14 of the AWGR (10) to pass through the BADM. The signal with identical wavelength with the dropped signal can be added through the right-hand side port 16 of the AWGR (10). The AWGR (10) multiplexes the signals folded back and added and the multiplexed downstream signals come out through the left-hand side port 6 of the AWGR (10). The multiplexed downstream signals pass through the Cir1, mid-stage device, (12) and the Cir2 and come out through the common port (e2) of the WSC2.

The upstream signals inputted to the common port (e2) of the WSC2 pass through the WSC2 and the Iso2 and enter into the AWGR (10) via right-hand side port 10. The AWGR demultiplexes the upstream signals and the demultiplexed signals come out through the left-hand side port 1, 3, 9, 11, 13 and 15 of the AWGR (10). Any of the demultiplexed signals can be either dropped or pass through the BADM. For example, the signal to be received at the BADM is dropped via the left-hand side port 1 of the AWGR (10). The other signals are folded back to the left-hand side port 2, 8, 10, 12 and 14 of the AWGR (10) to pass through the BADM. The signal with identical wavelength with the dropped signal can be added through the left-hand side port 16 of the AWGR (10). The AWGR (10) multiplexes the signals folded back and added and the multiplexed upstream signals come out through the right-hand side port 6 of the AWGR (10). The multiplexed downstream signals pass through the Cir2, mid-stage device (12) and the Cir1 and.come out through the common port (e1) of the WSC1.

The BADA module of FIG. 8 comprises above-described BADM and two bidirectional amplifiers (BOA1, BOA2) for amplifying signals. The BOA1 and the BOA2 used in FIG. 2 are connected to the common ports (e1, e2) of the WSC1 and the WSC2 in the above-described BADM. As shown in FIG. 8, the BADA module can further comprises two unidirectional amplifiers (UOA1 and UOA2) used in FIG. 2. The UOA1 is connected between the left-hand side port 6 of the AWGR (10) and the input port (a1) of the Cir1 to further amplify the downstream signal. The UOA2 is connected between the right-hand side port 11 of the AWGR (10) and the input port (a2) of the Cir2 to further amplify the upstream signal.

In the third embodiment of the BADM and BADA module, the signals first enter into the AWGR (10) and then pass through the mid-stage device (12), while the signals first pass though the mid-stage device (12) and then enter into the AWGR (10) in the first embodiment.

As mentioned forth, there are two RIN paths depicted in FIG. 5 and FIG. 6 when the optical fibers are connected to the both sides of the BADA module of FIG. 2. The RIN paths for the BADA modules of FIG. 7a, FIG. 7b and FIG. 8 are similar to that of FIG.2.

We can reduce the RINs by replacing the optical circulators (Cir1 and Cir2) in BADA module of FIG. 2, FIG. 7a, FIG. 7b and FIG. 8 with the two wavelength selective coupler and two optical isolators. The BADM and the BADA module according to the fourth embodiment of the present invention is realized from the first, the second and the third embodiments with the replacement.

Figure 9:
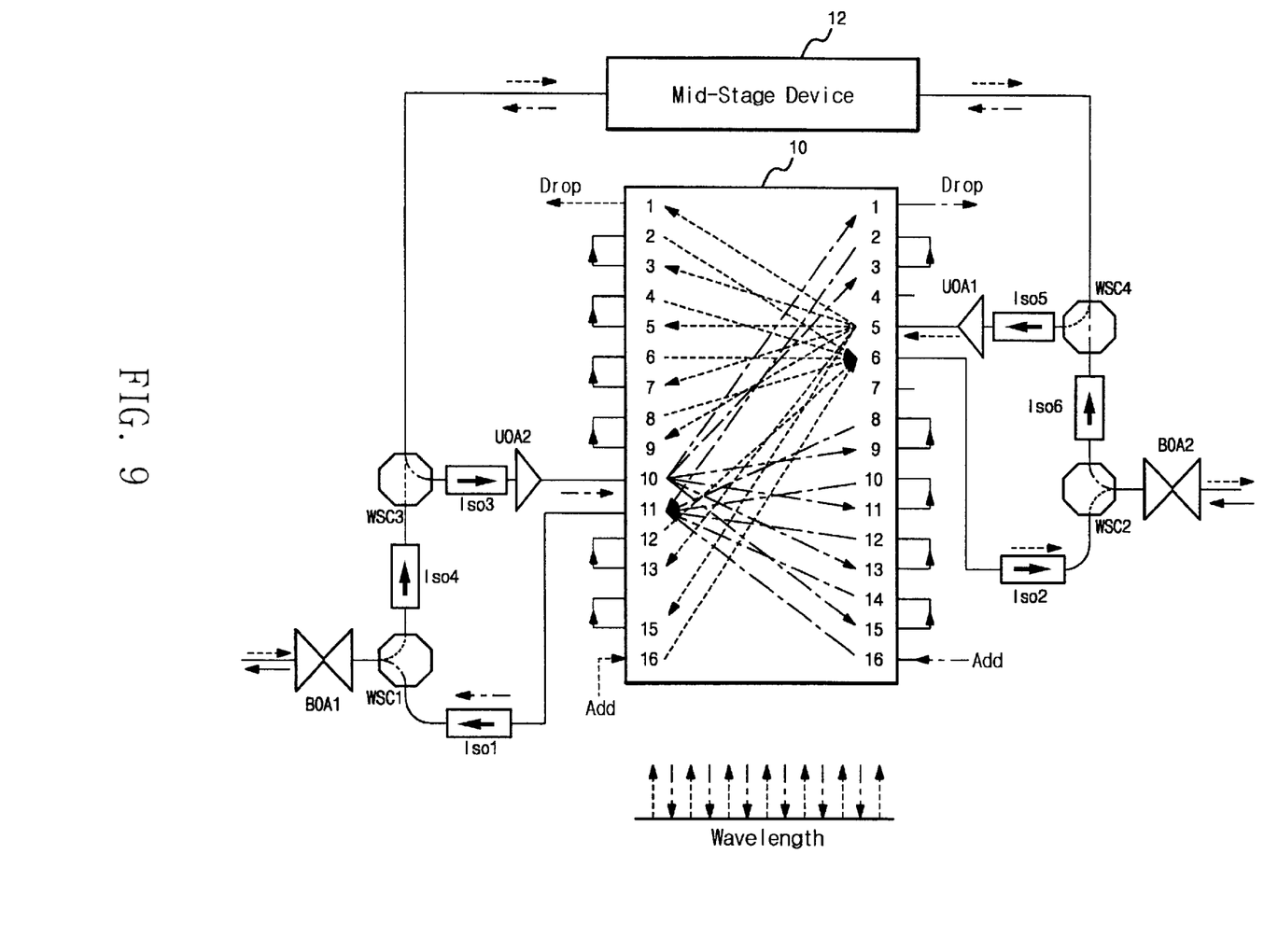
FIG. 9 shows a schematic diagram of the bidirectional add/drop multiplexer and the bidirectional add/drop amplifier module using a 16×16 array waveguide grating router according to the fourth embodiment.of the present invention.

FIG. 9 shows the fourth embodiment of BADM and the BADA module with the replacements: The first optical circulator (Cir1) in FIG. 2 is replaced with WSC3 and two optical isolators (Iso3, Iso4), and the second optical circulator (Cir2) with WSC4 and two other optical isolators (Iso5, Iso6). The replaced wavelength selective coupler (WSC3 or WSC4) attenuates the RIN in FIG. 5 and FIG. 6 one more time.

As mentions forth, the BADM and BADA module of FIG. 2 can accommodate more signal(s) by further comprising optical circulator(s) shown in FIG. 7. This method can be applied for the BADM and BADA module of (FIG. 8) or fourth (FIG. 9) embodiment to increase the number of accommodatable signals.

Meanwhile, in the BADM and BADA module according to the embodiments of the present invention, they can accommodate additional signals by using the periodicity of the AWGR (10). The signals separated by the multiple of the AWGR's FSR can propagate along the same route in the BADM and BADA module. By adding low-cost wavelength-division multiplexers/demultiplexers to the input/output ports of the AWGR (10) in the embodiments, we can add/drop the additional signals cost-effectively.

As mentioned so far, in the BADM and BADA module according to the present invention, the counter-propagating signals (upstream and downstream signals) share a single mid-stage device (12). Especially, since the upstream and downstream signals pass through the mid-stage device (12) in opposite direction each other, the nonlinear interactions between them will be negligible. In addition, the BADA module according to the present invention is designed to suppress the RINs induced by the multiple reflections.

Therefore, the BADM and the BADA module according to the embodiments of the present invention provide the following effects. First, the mid-stage device for increasing the capacity and extending the geographical scale of the network, including a DCF, a GFF and an ASE rejection filter, is incorporated economically with them. Second, there is little increase of the signal impairments induced by the nonlinear interactions between counter-propagating signals even though they share a single mid-stage device. Third, the RIN accumulation is sufficiently suppressed.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A bidirectional add/drop multiplexer comprising,
   (1) Two wavelength selective couplers (WSC1, WSC2) with an input port (d1 or d2), and output port (f1 or f2), and a common port (e1 or e2);
   (2) Two optical isolators (Iso1 or Iso2) with an input port (g1 or g2) and an output port (h1 or h2);
   (3) Two optical circulators (Cir1, Cir2) with an input port (a1 or a2), an output port (c1 or c2) and a common port (b1 or b2);
   (4) A multiplexing/demultiplexing means with N input/output ports at its both sides; and
   (5) a mid-stage device composed of a means for compensating the chromatic dispersion of the optical fibers, a means for flattening the spectral responses of the optical amplifiers, a means for suppressing accumulation of the amplified spontaneous emission noise or a combination of these means and wherein,
   (6) The output ports (f1 or f2) of the wavelength selective couplers (WSC1 or WSC2) are connected to the input ports (a1 or a2) of the optical circulators (Cir1 or Cir2);
   (7) The input ports (d1 or d2) of the wavelength selective couplers (WSC1 or WSC2) are connected to the output port (h1 or h2) of the optical isolator (Iso1 or Iso2);
   (8) The input ports (g1 or g2) of the optical isolators (Iso1 or Iso2) are connected to an input/output of the multiplexing/demultiplexing means;
   (9) the output ports (c1 or c2) of the optical circulators (Cir1 or Cir2) are connected to another input/output port of the multiplexing/demultiplexing means; and
   (10) The common ports (b1 and b2) of the optical circulators (Cir1 and Cir2) are connected to both ends of the mid-stage device (12).

2. A bidirectional add/drop multiplexer comprising,
   (1) Two wavelength selective couplers (WSC1, WSC2) with an input port (d1 or d2), an output port (f1 or f2), and a common port (e1 or e2);
   (2) Two optical isolators (Iso1, Iso2) with an input port (g1 or g2) and an output port (h1 and h2);
   (3) Two optical circulators (Cir1, Cir2) with an input port (a1 or a2), an output port (c1 or c2) and a common port (b1 or b2);
   (4) A multiplexing/demultiplexing means with N input/output ports at its both sides; and (5) A mid-stage device composed of a means for compensating the chromatic dispersion of the optical fibers, a means for flattening the spectral responses of the optical amplifiers, a means for suppressing accumulation of the amplified spontaneous emission noise or a combination of these means, and wherein, (6) The input ports (d1 or d2) of the wavelength selective couplers (WSC1 or WSC2) are connected to the output port (c1 or c2) of the optical circulators (Cir1 or Cir2);

(7) The output ports (f1 or f2) of the wavelength selective coupler (WSC1 or WSC2) are connected to the input port (g1 or g2) of the optical isolator (Iso1 or Iso2);

(8) The output ports (h1 or h2) of the optical isolators (Iso1 or Iso2) are connected to an input/output of the multiplexing/demultiplexing means;

(9) The input ports (a1 or a2) of the optical circulators (Cir1 or Cir2) are connected to another input/output port of the multiplexing/demultiplexing means and;

(10) The common ports (b1 and b2) of the optical circulators (Cir1 and Cir2) are connected to both ends of the mid-stage device (12).

3. A bidirectional add/drop multiplexer as defined in claim 1 or claim 2, wherein counter-propagating upstream.am/downstream signals pass through the mid-stage device in opposite directions each other.

4. A bidirectional add/drop multiplexer as defined in claim 1, or claim 2, wherein the multiplexing/demultiplexing means comprises an N×N arrayed waveguide grating router.

5. A bidirectional add/drop multiplexer (BADM) as defined in claim 4 further comprising an additional optical circulator (Cir3) with an input port (a3), an output port (c3) and a common port (b3), wherein the common port (b3) is connected to an input/output port of the arrayed waveguide grating router (AWGR) to accommodate up to N/2–1 upstream/downstream signals if the number (N) of input/output ports of the AWGR is an even integer.

6. A bidirectional add/drop multiplexer (BADM) as defined in claim 4 further comprising two additional optical circulators (Cir5, Cir6) with an input port (a5 or a6), an output port (c5 or c6) and a common port (b5 or b6), wherein the common port (b5 or b6) is connected to an input/output port of the arrayed waveguide grating router (AWGR) to accommodate up to (N−1)/2 upstream/downstream signals if the number (N) of input/output ports of the AWGR is an odd integer.

7. A bi-directional add/drop multiplexer is defined in claim 5 or claim 6, wherein the added and the dropped signals through an input/output port of the arrayed waveguide grating router (AWGR) are multiplexed signals separated by the multiple of the free spectral ranges of the AWGR.

8. A bidirectional add/drop multiplexer as defined in claim 1 or claim 2, wherein the optical circulator (Cir1 or Cir2) comprises a wavelength selective coupler (WSC3 or WSC4) and two optical isolators ((Iso3, Iso4) or (iso5, Iso6)).

9. A bi-directional add/drop multiplexer as defined in claim 1 or claim 2, wherein the wavelength selective coupler (WSC1, WSC2) comprises a wavelength interleaver.

10. A bidirectional add/drop multiplexer as defined in claim 1 or claim 2, wherein the wavelength selective coupler (WSC1, WSC2) comprises, (1) An optical circulator (Cir4) with an input (d4), an output (f4) and a common port (e4);

(2) A comb filter (CF1) with an input (j1) and an output port (k1), having pass/stop bands repeating periodically by a free spectral range; and (3) A comb pass filter (CF2) with an input (j2) and an output port (k2), having identical free spectral range (FSR) with the CF1 and characterized by the pass/stop bands offsetting by a half of the FSR from that of CF1, and wherein, (4) The output port (f4) of the optical circulator (Cir4) is connected to the input port (j1) of CF1; and (5) The input port of (d4) of the optical circulator (Cir4) is connected to the output port (k2) and CF2.

11. A bi-directional add/drop amplifier module comprising, (1) Two wavelength selective couplers (WSC1, WSC2) with an input port (d1 or d2), an output port (f1 or f2), and a common port (e1 or e2);

(2) Two optical isolators (Iso1, Iso2) with an input port (g1 or g2) and an output port (h1 and h2);

(3) Two optical circulators (Cir1, Cir2) with an input port (a1 or a2), an output port (c1 or c2) and a common port (b1 or b2);

(4) A multiplexing/demultiplexing means with N input/output ports at its both sides;

(5) A mid-stage device composed of a means for compensating the chromatic dispersion of the optical fibers, a means for flattening the spectral responses of the optical amplifiers, a means for suppressing accumulation of the amplified spontaneous emission noise or a combination of these means, and wherein, (6) Two bi-directional optical amplifiers (BOA1, BOA2) amplifying counter-propagating signals simultaneously, and wherein, (7) The output ports (f1 or f2) of the wavelength selective coupler (WSC1 or WSC2) are connected to the input port (a1 or a2) of the optical circulator (Cir1 or Cir2);

(8) The input ports (d1 or d2) of the wavelength selective couplers (WSC1 or WSC2) are connected to the output port (h1 or h2) of the optical isolators (Iso1 or Iso2);

(9) The input ports (g1 or g1) of the optical isolators (Iso1 or Iso2) are connected to an input/output port of the multiplexing/demultiplexing means.

(10) The output ports (c1 or c2) of the optical circulators (Cir1 or Cir2) are connected to another input/output port of the multiplexing/demultiplexing means;

(11) The common ports (b1 and b2) of the optical circulator (Cir1 and Cir2) are connected to both ends of the mid-stage device (12); and (12) The common ports (e1 or e2) of the wavelength selective couplers (WSC1 or WSC2) are connected to a bi-directional optical amplifier (BOA1 or BOA2).

12. A bidirectional add/drop amplifier module as defined in claim 11 further comprising two unidirectional amplifiers (UOA1, UOA2) amplifying each way signal, wherein the unidirectional amplifier (UOA1 or UOA2) is inserted between the output port (c1 or c2) of the optical circulator (Cir1 or Cir2) and the multiplexing/demultiplexing means.

13. A bidirectional add/drop amplifier module comprising, (1) Two wavelength selective couplers (WSC1, WSC2) with an input port (d1 or d2), an output port (f1 or f2), and a common port (e1 or e2);

(2) Two optical isolators (Iso1, Iso2) with an input port (g1 or g2) and an output port (h1 and h2);

(3) Two optical circulators (Cir1, Cir2) with an input port (a1 or a2), an output port (c1 or c2) and a common port (b1 or b2);

(4) A multiplexing/demultiplexing means with N input/output ports at its both sides;

(5) A mid-stage device composed of a means for compensating the chromatic dispersion of the optical fibers, a means for flattening the spectral responses of the optical amplifiers, a means for suppressing accumulation of the amplified spontaneous emission noise or a combination of these means, and wherein, (6) Two bidirectional optical amplifiers (BOA1, BOA2) amplifying counter-propagating signals simultaneously, and wherein, (7) The input ports (d1 or d2) of the wavelength selective couplers (WSC1 or WSC2) are connected to the output port (c1 or c2) of the optical circulators (Cir1 or Cir2);

(8) The output ports (f1 or f2) of the wavelength selective couplers (WSC1 or WSC2) are connected to the input port (g1 or g2) of the optical isolator (Iso1 or Iso2);

(9) The output ports (h1 or h2) of the optical isolators (Iso1 or Iso2) are connected to an input/output of the multiplexing/demultiplexing means;

(10) The input ports (a1 or a2) of the optical circulators (Cir1 or Cir2) are connected to another input/output port of the multiplexing/demultiplexing means;

(11) The common ports (b1 and b2) of the optical circulator (Cir1 and Cir2) are connected to both ends of the mid-stage device (12); and (12) The common ports (e1 or e2) of the wavelength selective couplers (WSC1 or WSC2) are connected to a bi-directional optical amplifier (BOA1 or BOA2).

14. A bidirectional add/drop amplifier module as defined in claim 13 further comprising two unidirectional amplifiers (UOA1, UOA2) amplifying each way signal, wherein the unidirectional amplifier (UOA1 or UOA2) is inserted between the input port (a1 or a2) of the optical circulator (Cir1 or Cir2) and the multiplexing/demultiplexing means.

15. A bidirectional add/drop amplifier module as defined in claim 11 or claim 13, wherein the bidirectional optical amplifier (BOA1 or BOA2) comprises one of the followings; a semiconductor optical amplifier, a rare-earth doped optical fiber amplifier, and a Raman optical fiber amplifier.

16. A bidirectional add/drop amplifier module as defined in claim 12 or claim 14, wherein each of the bidirectional optical amplifier (BOA1 or BOA2) and the unidirectional optical amplifier (UOA1 or UOA2) comprises one of the followings; a semiconductor optical amplifier, a rare-earth doped optical fiber amplifier, and a Raman optical fiber amplifier.

* * * * *